US012546721B2

(12) United States Patent
Stanley et al.

(10) Patent No.: US 12,546,721 B2
(45) Date of Patent: Feb. 10, 2026

(54) MULTISPECTRAL DETECTION AND CLASSIFICATION OF BACTERIA UTILIZING SCATTERING AND/OR ABSORBANCE, EXCITATION, EMISSIONS UTILIZING MACHINE LEARNING

(71) Applicant: Lightsense Technology, Inc., Tucson, AZ (US)

(72) Inventors: Michael Edward Stanley, Mesa, AZ (US); Richard Kris, Tucson, AZ (US); Terje Skotheim, Tuscon, AZ (US); Wade Poteet, Vail, AZ (US)

(73) Assignee: Lightsense Technology, Inc., Tucson, AZ (US)

( * ) Notice: Subject to any disclaimer, the term of this patent is extended or adjusted under 35 U.S.C. 154(b) by 207 days.

(21) Appl. No.: 18/419,142

(22) Filed: Jan. 22, 2024

(65) Prior Publication Data
US 2024/0248039 A1   Jul. 25, 2024

Related U.S. Application Data

(60) Provisional application No. 63/481,103, filed on Jan. 23, 2023.

(51) Int. Cl.
*G01N 21/64* (2006.01)
*C12Q 1/02* (2006.01)
(Continued)

(52) U.S. Cl.
CPC .......... *G01N 21/6486* (2013.01); *C12Q 1/02* (2013.01); *G01N 21/31* (2013.01); *G01N 21/4738* (2013.01)

(58) Field of Classification Search
CPC ............... G01N 21/6486; G01N 21/31; G01N 21/4738; G01N 21/65; C12Q 1/02
See application file for complete search history.

(56) References Cited

U.S. PATENT DOCUMENTS 4,983,523 A * 1/1991 Li .................... C12N 1/066
435/89
5,712,167 A * 1/1998 Yamaguchi ........... G01N 21/65
436/171
(Continued)

FOREIGN PATENT DOCUMENTS

WO   2007030020   3/2007
WO   2009011585   1/2009
(Continued)

OTHER PUBLICATIONS

Dartnell, Lewis R et al., "Fluorescence Characterization of Clinically-important Bacteria", PLOS ONE, Sep. 2013, vol. 8, Issue 9, e75270, 13 pages.

(Continued)

*Primary Examiner* — David J Makiya
*Assistant Examiner* — Gisselle M Gutierrez
(74) *Attorney, Agent, or Firm* — Jaffery Watson Hamilton & DeSanctis LLP

(57) ABSTRACT

The example techniques and mechanisms described herein can enable relatively inexpensive and/or relatively fast classification of aqueous samples of bacteria or viruses. The example techniques and mechanisms described herein can enhance prior generations of miniature spectrophotometers to include Mie scattering effects. The example techniques and mechanisms described herein can provide a relatively small increase in cost over prior approaches while providing improved classification accuracy based on addition of Mie scattering data to absorbance and emissions data.

20 Claims, 14 Drawing Sheets

(51) Int. Cl.
  *G01N 21/31* (2006.01)
  *G01N 21/47* (2006.01)

(56) References Cited

U.S. PATENT DOCUMENTS

| | | | |
|---|---|---|---|
| 5,784,162 | A | 7/1998 | Cabib |
| 6,040,191 | A * | 3/2000 | Grow ............... G01N 35/00009 |
| | | | 436/172 |
| 6,834,237 | B2 | 12/2004 | Noergaard |
| 7,952,693 | B2 | 5/2011 | Serebrennikova |
| 8,227,260 | B2 | 7/2012 | Yguerabide |
| 8,652,800 | B2 | 2/2014 | Walsh |
| 9,788,728 | B2 | 10/2017 | Perelman |
| 10,196,427 | B2 | 2/2019 | Glanville |
| 10,302,642 | B2 * | 5/2019 | Melanson ........ G01N 33/56911 |
| 10,988,792 | B2 | 4/2021 | Walsh |
| 2007/0037135 | A1 | 2/2007 | Barnes |
| 2013/0288295 | A1 * | 10/2013 | Walsh .................... G01N 21/31 |
| | | | 435/38 |
| 2014/0197335 | A1 * | 7/2014 | Jayasooriya ............... G01J 3/44 |
| | | | 250/459.1 |
| 2015/0233917 | A1 * | 8/2015 | Melanson ............ G01N 33/579 |
| 2016/0356695 | A1 | 12/2016 | Gabriel |
| 2017/0052118 | A1 | 2/2017 | Loock |
| 2017/0138845 | A1 | 5/2017 | Birarda |
| 2018/0156795 | A1 * | 6/2018 | Melanson ............... G01N 21/17 |
| 2019/0376942 | A1 | 12/2019 | Birlouez-Aragon |
| 2020/0018685 | A1 * | 1/2020 | Scarcelli ............. G01N 15/147 |
| 2020/0132652 | A1 * | 4/2020 | Kim ................ C12Y 402/01001 |
| 2020/0268252 | A1 * | 8/2020 | Litvinova ............ G06N 3/0495 |
| 2020/0400576 | A1 | 12/2020 | Ingber |
| 2021/0106231 | A1 | 4/2021 | Radhakrishnan |
| 2021/0364412 | A1 | 11/2021 | Daaboul |
| 2021/0389243 | A1 | 12/2021 | Sela |
| 2024/0288367 | A1 * | 8/2024 | Perelman .................. C12Q 1/04 |
| 2025/0052683 | A1 * | 2/2025 | Mahajan ................. G01N 21/21 |

FOREIGN PATENT DOCUMENTS

| | | |
|---|---|---|
| WO | 2017123926 | 7/2017 |
| WO | 202126083 | 12/2021 |
| WO | 2022096648 | 5/2022 |

OTHER PUBLICATIONS

Koch, Arthur L et al., "The Size and Shape of Bacteria by Light Scattering Measurements", Biochimica et Biophysica Acta, Sep. 3, 1968, pp. 262-273.

Wagner, P.E., "A Constant-Angle Mie Scattering Method (CAMS) for Investigation of Particle Formation Processes", Journal of Colloid and Interface Science, vol. 105, No. 2, Jun. 1985, 12 pages.

Vazquez-Pufleau, Miguel et al., "Development of an ultraviolet constant angle Mie scattering detector toward the determination of aerosol growth kinetics in the transition and free molecular regime", https://doi.org/10.1080/02786826.2020.1736504, published online Mar. 18, 2020, 13 pages.

"Light Scattering by Tissue and Cells", Hunter College, 5 pages.

Qiu, Le et al., "Rapid detection and identification of bacteria directly from whole blood with light scattering spectroscopy based biosensor", 2021, 6 pages.

Xu, Min et al., "Unified Mie and fractal scattering by cells and experimental study on application in optical characterization of cellular and subcellular structures", Journal of Biomedical Optics 13(2), 024015 (Mar./Apr. 2008), 9 pages.

Pan, Yong-Le et al., "Review of elastic light scattering from single aerosol particles and applicatioon in bioaerolsol detection" Digital Commons @ West Chester University, Mar. 2022, 25 pages.

Hu, Yuxia et al., "Analytic Method on Characteristic Parameters of Bacteria in Water by Multiwavelength Transmission Spectroscopy", Journal of Spectroscopy, vol. 2017, Article ID 4039048, 8 pages.

Shlosberg, Yaniv et al., "Fast label-free identification of bacteria of synchronous fluorescence of amino acids", Analytical and Bioanalytical Chemistry, Sep. 2021, 11 pages.

Alupoaei, Catalina E., "Quantitative spectroscopy analysis of prokaryotic cells: vegetative cells and spores", Biosensors and Bioelectronics 19, 2004, pp. 893-903.

Esfahani, Milad Rabbani et al., "Extinction, emission, and scattering spectroscopy of 5-50 nm citrate-coated gold nanoparticles: An argument for curvature effects on aggregation", Spectrochimica Acta Part A: Molecular and Biomolecular Spectroscopy 175 (2017), pp. 100-109.

* cited by examiner

EEM PLOT 402

2-D SPECTRA EXTRACTED FROM 3-D EEM DATA 502

ELASTIC SCATTERING SPECTRA PLOT 602

AVERAGE RAYLEIGH/MIE SCATTERING SPECTRA 802

SCATTERING PROBABILITY AS A FUNCTION OF WAVELENGTH 1302

MULTISPECTRAL DETECTION AND CLASSIFICATION OF BACTERIA UTILIZING SCATTERING AND/OR ABSORBANCE, EXCITATION, EMISSIONS UTILIZING MACHINE LEARNING

This application claims priority to U.S. Provisional Patent Application No. 63/481,103 filed Jan. 23, 2023 by Michael Edward Stanely, et al., which is entitled "DETECTION SYSTEMS ANMULTISPECTRAL DETECTION AND CLASSIFICATION OF BACTERIA UTILIZING UV-VISIBLE ABSORBANCE, EMISSIONS AND SCATTERING COUPLED UTILIZING MACHINE LEARNING," which is incorporated by reference herein.

FIELD

Example embodiments generally relate to analyzing and examining fluids containing biological entities using two or more particular spectroscopic processes and a particular sample preparation and data analysis set of processes.

BACKGROUND

Spectroscopy is the study of the interaction of matter with electromagnetic energy, including, for example, spectroscopies in which the electromagnetic energy is in the form of light beams of various wavelengths. Known measuring systems deliver a beam of light to the sample, where energy from that beam interacts with molecules within the sample to elicit the measured emitted, absorbed, and/or scattered energy for analysis. These measuring systems that determine certain conditions in humans, animals, and liquid samples using spectroscopy use comparison of analysis results to a database of signatures specific to a type of molecule being examined. These systems may use a spectrometer or other spectrum-sensing method to gather spectral data from the sample. The results may verify whether the sample contains a biological entity of interest, i.e., viruses, bacteria, or biomarkers, which could indicate a condition or conditions in the host from which the sample was obtained.

BRIEF SUMMARY

Example systems can provide classification of an aqueous sample having bacteria or viruses by applying selected wavelengths to the sample, measuring an absorbance (A) and an excitation-emission matrix (EEM) corresponding to the selected wavelengths for the sample, extracting, from the EEM, scattering (D), excitation (X) and emissions (E) spectra, extracting one or more raw features from one or more of A, EEM, D, X and E for the sample, performing machine learning operations corresponding to the sample based on the extracted raw features, generating classification information for the sample based on the machine learning operations and one or more of A, EEM, D, X and E for the sample, and generating an output indicating the classification.

BRIEF DESCRIPTION OF THE DRAWINGS

The various advantages and features of the described technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description below is intended to describe various configurations of the subject technology. It is not intended to represent the only configurations in which the subject technology can be practiced. The appended drawings are incorporated herein and constitute a part of the detailed description. The detailed description includes details to provide a more thorough understanding of the technology. However, it will be clear and apparent that the subject technology is not limited to the specific details set forth herein and may be practiced without these details. In some instances, structures and components are shown in block diagram form to avoid obscuring the concepts of the subject technology.

The example techniques and mechanisms described herein can enable relatively inexpensive and/or relatively fast classification of aqueous samples of, for example, bacteria. The example techniques and mechanisms described herein can enhance prior generations of miniature spectrophotometers to include Mie and/or Rayleigh scattering effects to provide additional information for classification operations, including, for example, machine learning techniques. The example techniques and mechanisms described herein can provide a relatively small increase in cost over prior approaches while providing improved classification accuracy based on adding Mie scattering data to absorbance and emissions data.

In the examples that follow, the use of selected wavelengths (e.g., provided by one or more light-emitting diodes (LEDs) and corresponding light multiplexing) that are dependent upon the bacterium species to be identified can be utilized to support the utilization of absorbance emission, and Mie scattering data to identify the bacterium species. In some example configurations, a bacteria concentration of >1E7 CFU/ml can provide the necessary Mie scattering data, which can be a colony dissolved in 2-3 ml of sample solution.

Because the analysis is based primarily on shape and size, the techniques and mechanisms described herein may be less effective as the number of classes (i.e., bacterium types) increases beyond tens of species. In an example, the techniques and mechanisms described herein can be applied to data measured via a standard desktop photospectrometer capable of measuring UV-visible excitation-emission (EEM) data.

Figure 1:
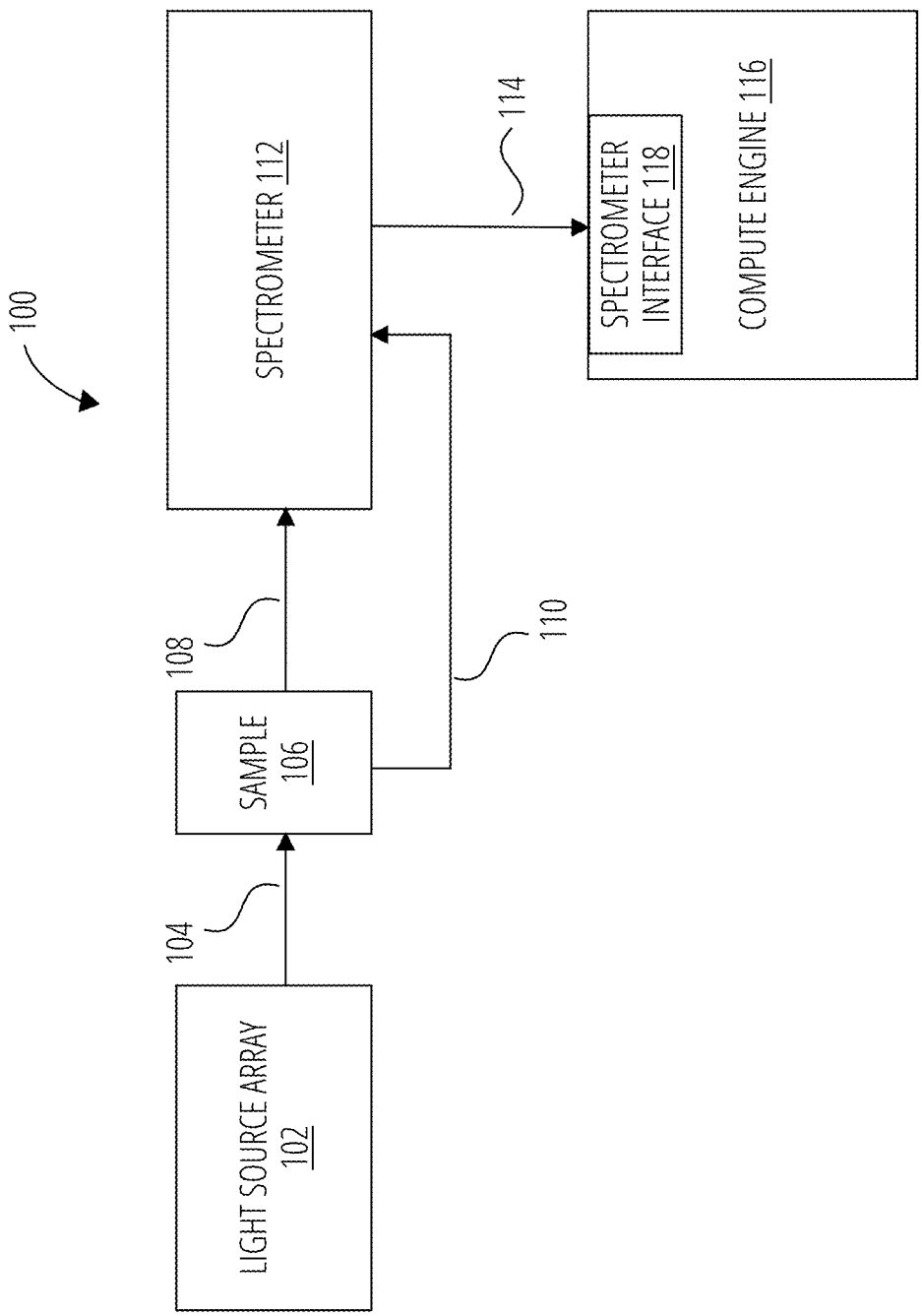
FIG. 1 is a block diagram of an example spectrophotometer system.

FIG. 1 is a block diagram of an example spectrophotometer system. In the example architecture of FIG. 1, spectrophotometer system 100 includes light source array 102, spectrometer 112, and compute engine 116 to analyze sample 106. In an example, light source array 102 provides six wavelengths (e.g., 260 nm, 300 nm, 370 nm, 400 nm, 500 nm, 600 nm) with six corresponding individual LED light sources. Additional and/or different wavelengths can be provided. Alternative architectures can also be supported.

Spectrophotometer system 100 determines absorbance measurements corresponding to sample 106 based on incident light beam 104 from light source array 102 via direct optical path 108. Spectrophotometer system 100 determines emission-based measurements corresponding to sample 106 based on incident light beam 104 from light source array 102 via 90-degree optical path 110. Light from direct optical path 108 and from 90-degree optical path 110 is captured by spectrometer 112 and analyzed by compute engine 116, which can have spectrometer interface 118. Various spectrometer data captured by spectrometer 112 can be processed and/or provided in raw form to compute engine 116 (e.g., as spectrometer data 114). In an example, compute engine 116 provides data extraction, data analysis and/or machine learning functionality on spectrometer data 114 as received via spectrometer interface 118.

In an example, absorbance measurements are via direct optical path 108 and are of the same frequency as incident light beam 104. Expected emissions normally occur at light wavelength(s) greater than the source light illuminating sample 106. Wavelengths near the incident light beam 104 wavelengths are normally filtered out of the emission data.

As described in greater detail below, information embedded in those frequencies that are normally discarded from the emissions data can be utilized to aid in the classification process. The information results from scattering phenomena described by Rayleigh Scattering and by Mie Scattering theories. In various examples described herein, relatively minimal modifications to the design of a typical physical spectrophotometer design are required to achieve the desired results. For example, the addition of light sources at specific wavelengths chosen to emphasize scattering differences between different bacteria can be used to provide sufficient information to identify characteristics of specific bacteria.

Figure 2:
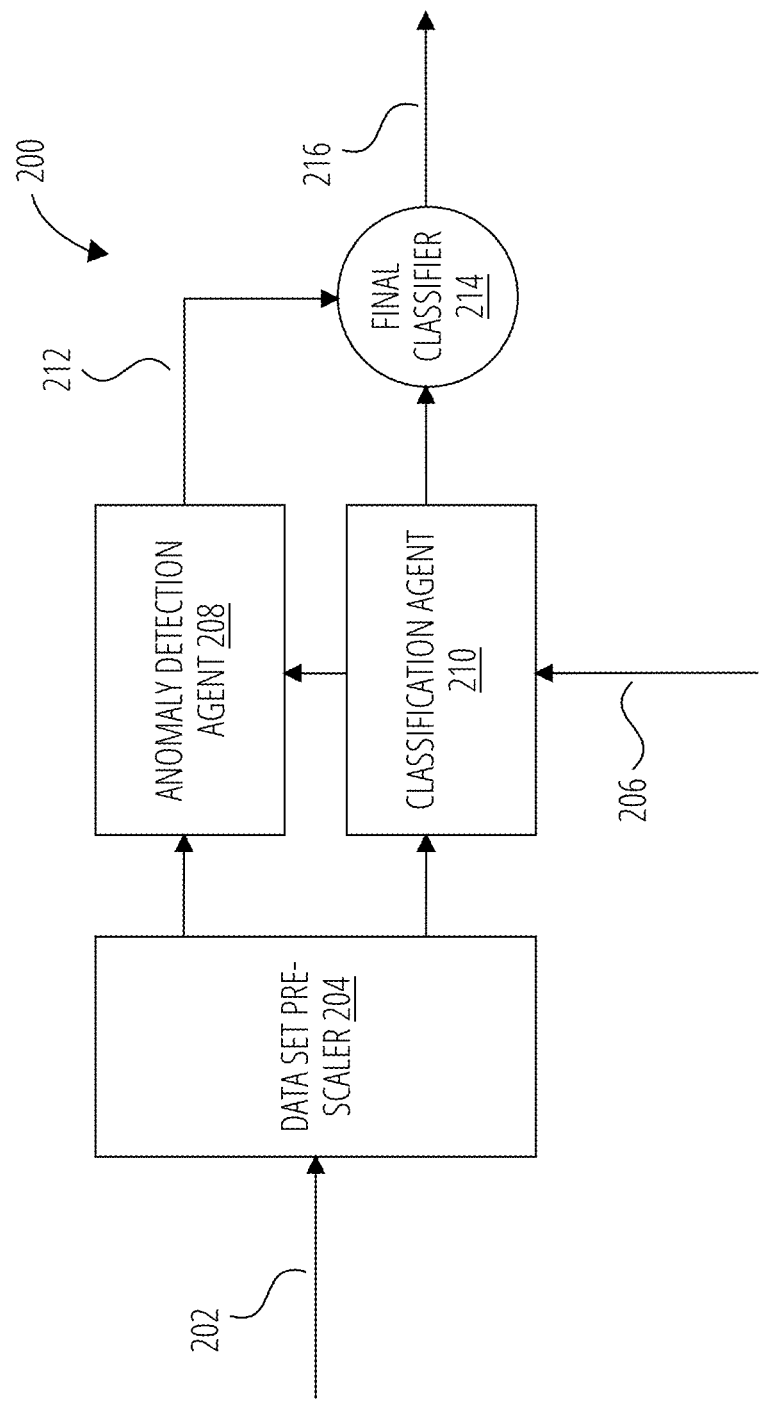
FIG. 2 is a block diagram of a system to provide class assignments based on enhanced photodetection spectroscopy (EPS) sensor outputs.

FIG. 2 is a block diagram of a system to provide class assignments based on enhanced photodetection spectroscopy (EPS) sensor outputs. The components of the example classification system 200 of FIG. 2 can be in spectrometer 112 of FIG. 1, in compute engine 116 of FIG. 1 or some combination thereof.

EPS sensor output(s) 202 are provided to data set pre-scaler 204. EPS refers to signals resulting from the integration of two or more spectroscopies to provide improved sensitivity. Data set pre-scaler 204 resizes the distribution of EPS sensor output(s) 202 values so that the mean of the observed values is 0 and the standard deviation is 1. This is one possible prescaler that can be utilized. Many others can also be supported. Data set pre-scaler 204 provides a pre-processing step before the data is provided to machine learning models to standardize the range of functionality of the input dataset.

The scaled data from data set pre-scaler 204 is provided to anomaly detection agent 208 and classification agent 210. In an example, anomaly detection agent 208 can be a support vector machine (SVM); however, use of an SVM is just one of many possible implementations for anomaly detection agent 208.

In general, anomaly detection agent 208 finds a hyperplane in an N-dimensional space that distinctly classifies data points where hyperplanes are decision boundaries that help classify the data points. The dimension of the hyper plane depends on the number of features. In the example of FIG. 2, anomaly detection agent 208 receives the scaled data set from data set pre-scaler 204 and data representing known classes (e.g., training data 206) upon which the SVM analysis is performed. In an example, SVM output data 212 indicates whether the input data to anomaly detection agent 208 is consisted with training data 206 (e.g., sets the output class to "Unknown" if the data is inconsistent).

In an example, classification agent 210 uses a logistic statistical model to model the probability of an event taking place by having the odds of an event be a linear combination of independent variables. In alternative configurations, different classification techniques can be utilized. In the example of FIG. 2, classification agent 210 receives the scaled data set from data set pre-scaler 204 and data representing known classes (e.g., training data 206) upon which the logistical regression analysis is performed.

Final classifier 214 receives outputs from anomaly detection agent 208 and classification agent 210 and determines whether EPS sensor output(s) 202 indicates the presence of any of the type of biological entities for which training data 206 has been provided. In the example including FIG. 7, FIG. 8, FIG. 9 and FIG. 10 the possible classes are: E. Coli O157, Salmonella-Newport, Listeria-monocytogenes, and E. Coli K12. Different groups of possible classes and/or a different number of possible classes can also be supported. Class assignment 216 can be provided to various types of devices (e.g., embedded screen, remote screen, data to a storage device, data to a remote computing device, data to a mobile device) to provide the desired feedback.

Figure 3:
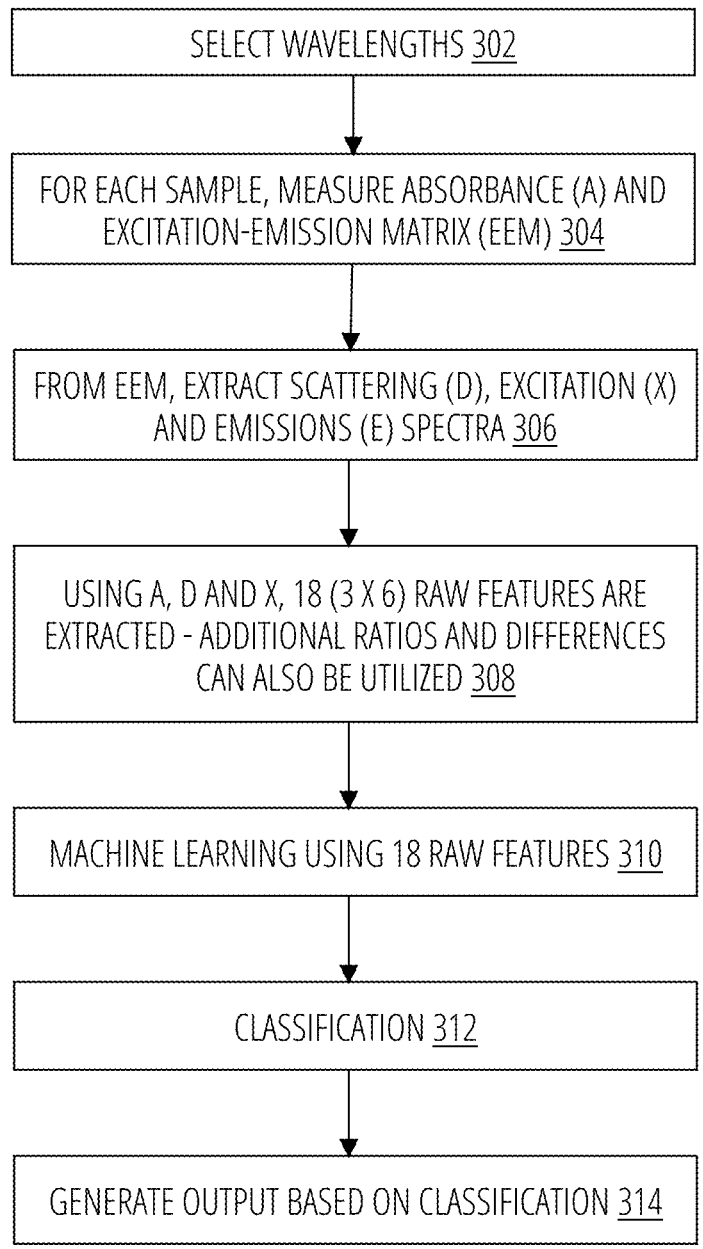
FIG. 3 is a flow diagram of an example technique for using enhanced photodetection spectroscopy (EPS) for classification.

FIG. 3 is a flow diagram of an example technique for classification using enhanced photodetection spectroscopy (EPS). The functionality described with respect to FIG. 3 can be provided by, for example, spectrometer 112 or compute engine 116 as illustrated in FIG. 1 (or some combination thereof).

Wavelengths to be utilized are selected, block 302. In the examples discussed herein, six wavelengths can be utilized, and these six wavelengths can be 260 nm, 300 nm, 370 nm, 400 nm, 500 nm, and 600 nm. As another example, six wavelengths can be utilized, and these six wavelengths can be 275 nm, 300 nm, 370 nm, 400 nm, 500 nm, and 600 nm. As another example, six wavelengths can be utilized, and these six wavelengths can be 280 nm, 300 nm, 370 nm, 400 nm, 500 nm, and 600 nm. As another example, seven wavelengths can be utilized, which can be 260 nm, 275 nm, 300 nm, 370 nm, 400 nm, 500 nm, and 600 nm. As another example, seven wavelengths can be utilized, which can be 260 nm, 280 nm, 300 nm, 370 nm, 400 nm, 500 nm, and 600 nm.

For each sample, absorbance information (A) and an excitation-emission matrix information (EEM) are measured, block 304. The absorbance information and/or the excitation-emission matrix information can be stored in a memory or storage device (e.g., in compute engine 116). The approaches described herein allow for selection of optimal wavelengths for available data points. In an example, the absorbance and/or the excitation-emission matrix information can be part of EPS sensor output(s) 202 in FIG. 2.

Scattering (D), excitation (X) and/or emissions (E) spectra information is extracted from the excitation-emission matrix information, block 306. The scattering, excitation and/or emissions spectra information can be stored in a memory or storage device (e.g., in compute engine 116). In an example, the scattering, excitation and/or emissions spectra information can be part of EPS sensor output(s) 202 in FIG. 2.

In an example, using the absorbance information, the scattering information and the excitation information, 18 raw features are extracted, block 308. These 18 raw features can be inputs for machine learning techniques, block 310. In other examples, a different number of raw features can be extracted (block 308) and used for machine learning (block 310).

Classification can be performed (block 312) based on the obtained information and machine learning results. One or more outputs (e.g., images on a display, electronic message, sounds, flashing lights) can be generated (block 314) based on the classification.

Figure 4:
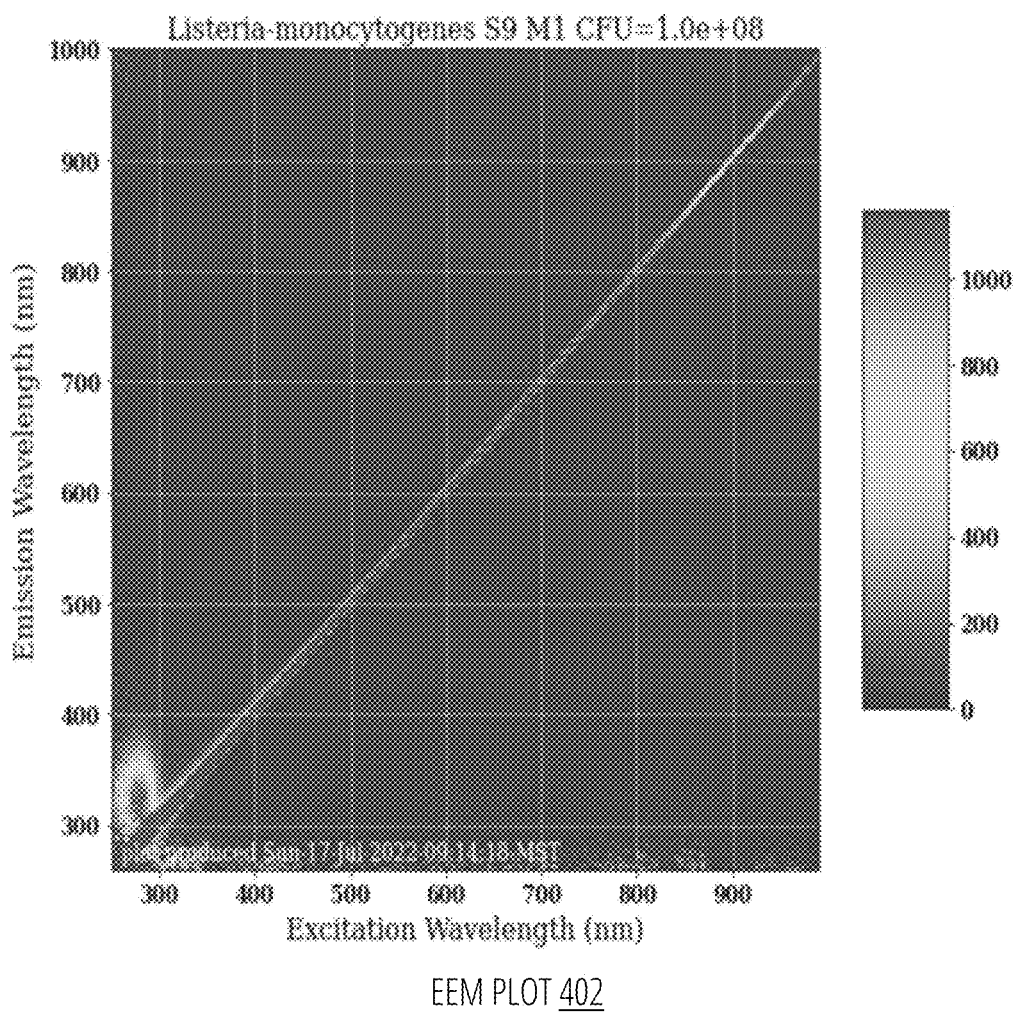
FIG. 4 is an example excitation-emission (EEM) plot for a sample of Listeria monocytogenes measured using a commercial desktop spectrophotometer.

FIG. 4 is an example excitation-emission (EEM) plot for a sample of Listeria monocytogenes measured using a commercial desktop spectrophotometer. In EEM plot 402 there is an emission peak at approximately $\lambda_{exc}$=280 nm excitation and $\lambda_{emm}$=330 nm emission wavelengths. The example of approximately $\lambda_{exc}$=280 nm excitation and $\lambda_{emm}$=330 nm wavelengths can be effective for detection of bacteria. Other wavelengths can be used to detect other biological entities. The data along the diagonal of EEM plot 402 arises from elastic scattering mechanism and is usually ignored using conventional spectrophotometer analysis techniques. Two-dimensional emission and excitation spectra are derived by taking vertical and horizontal slices from the data in EEM plot 402.

Figure 5:
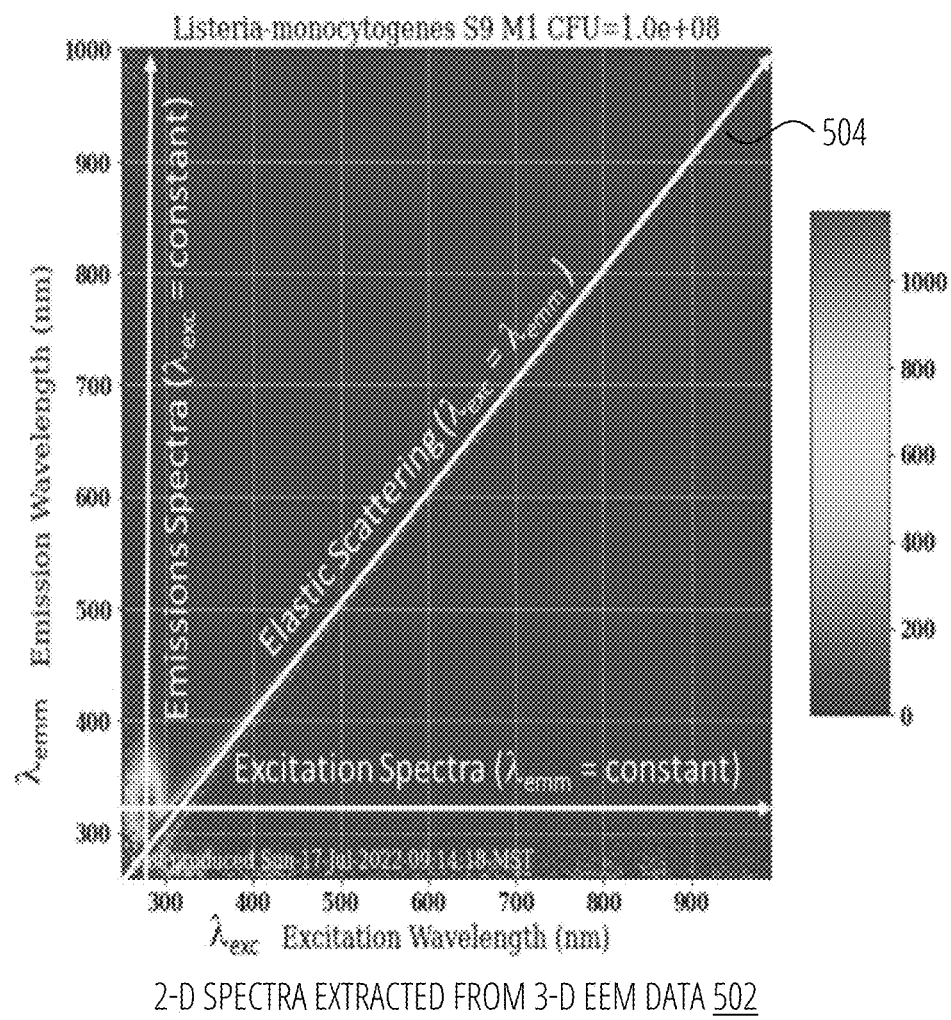
FIG. 5 is an example plot illustrating two-dimensional emission and excitation spectra derived by taking vertical and horizontal slices, respectively, from EEM plot data of FIG. 4.

FIG. 5 is an example plot illustrating two-dimensional emission and excitation spectra derived by taking vertical and horizontal slices from EEM plot data of FIG. 4. FIG. 5 further illustrates the source of scattering spectra (e.g., scattering spectra data providing information related to the shape and size of a scattering object 504) utilized by the approaches described herein. As described in greater detail below, data along the diagonal (as illustrated by 2-D spectra extracted from 3-D EEM data 502) contains information relating to the shape and size of the scattering objects (bacterium in the examples of FIG. 4 and FIG. 5) that is consistent with Mie scattering theory.

Figure 6:
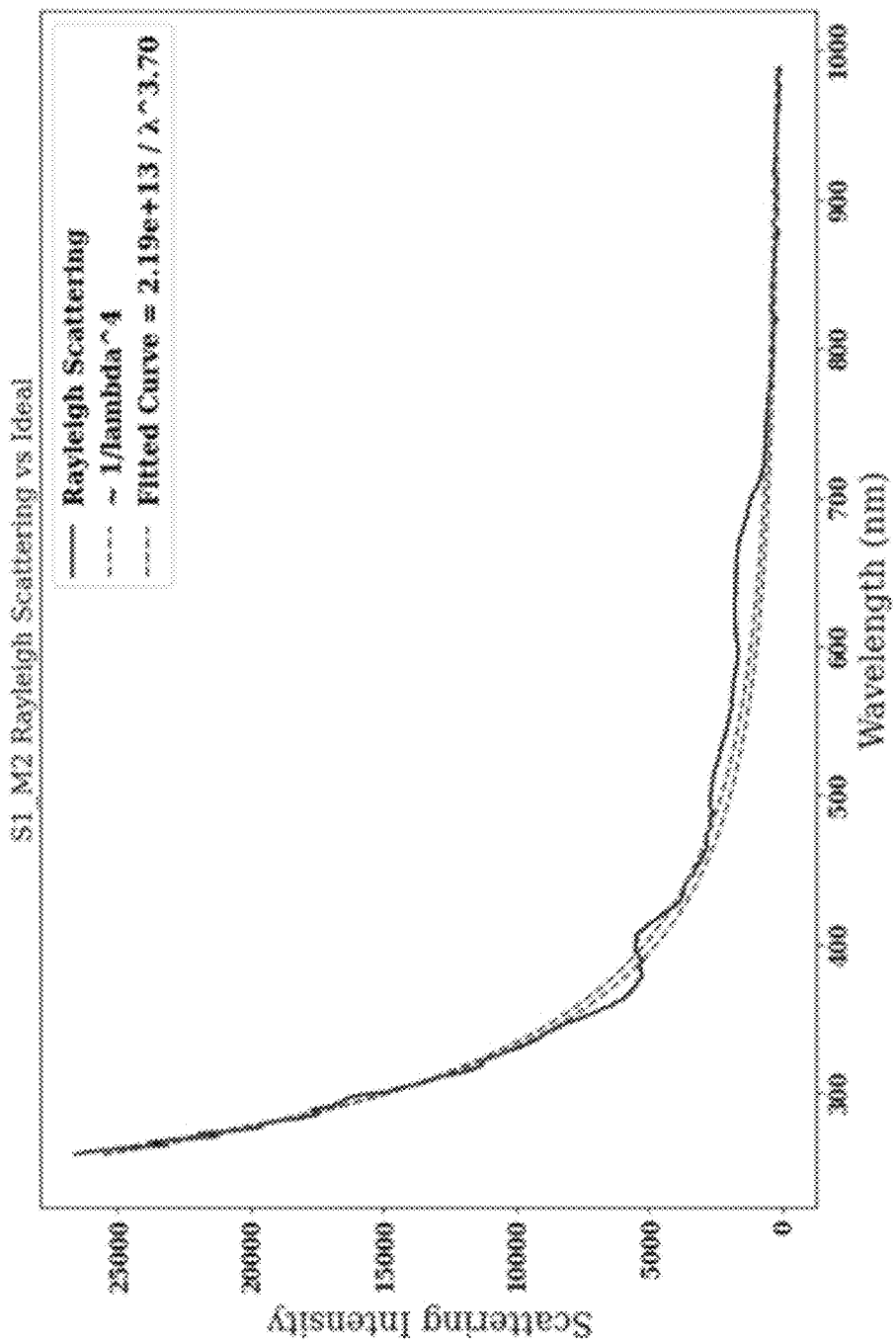
FIG. 6 is a plot of elastic scattering spectra extracted from measured EEM data.

FIG. 6 is a plot of elastic scattering spectra extracted from measured EEM data. The spectra illustrated in elastic scattering spectra plot 602 roughly decreases in a $1/\lambda^4$ fashion as predicted by Mie and Rayleigh scattering theory. Variations as illustrated by elastic scattering spectra plot 602 have commonly been assumed to be the result of randomness in the measurements. However, repeated measurements (some examples provided in FIG. 7) show that the variations are largely systemic in nature, which is consistent with Mie scattering theory.

The general approach of applying Mie scattering theory for use in identification of bacteria has been utilized; however, the solution of the Mie scattering problem is non-trivial and requires solving of electromagnetic field equations that are dependent upon the size, shape and makeup of the scattering elements. As described in greater detail below, by applying machine learning techniques, it is not necessary to completely solve these equations. In some of the examples that follow, it may be sufficient to collect sufficient data and apply machine learning techniques.

Figure 7:
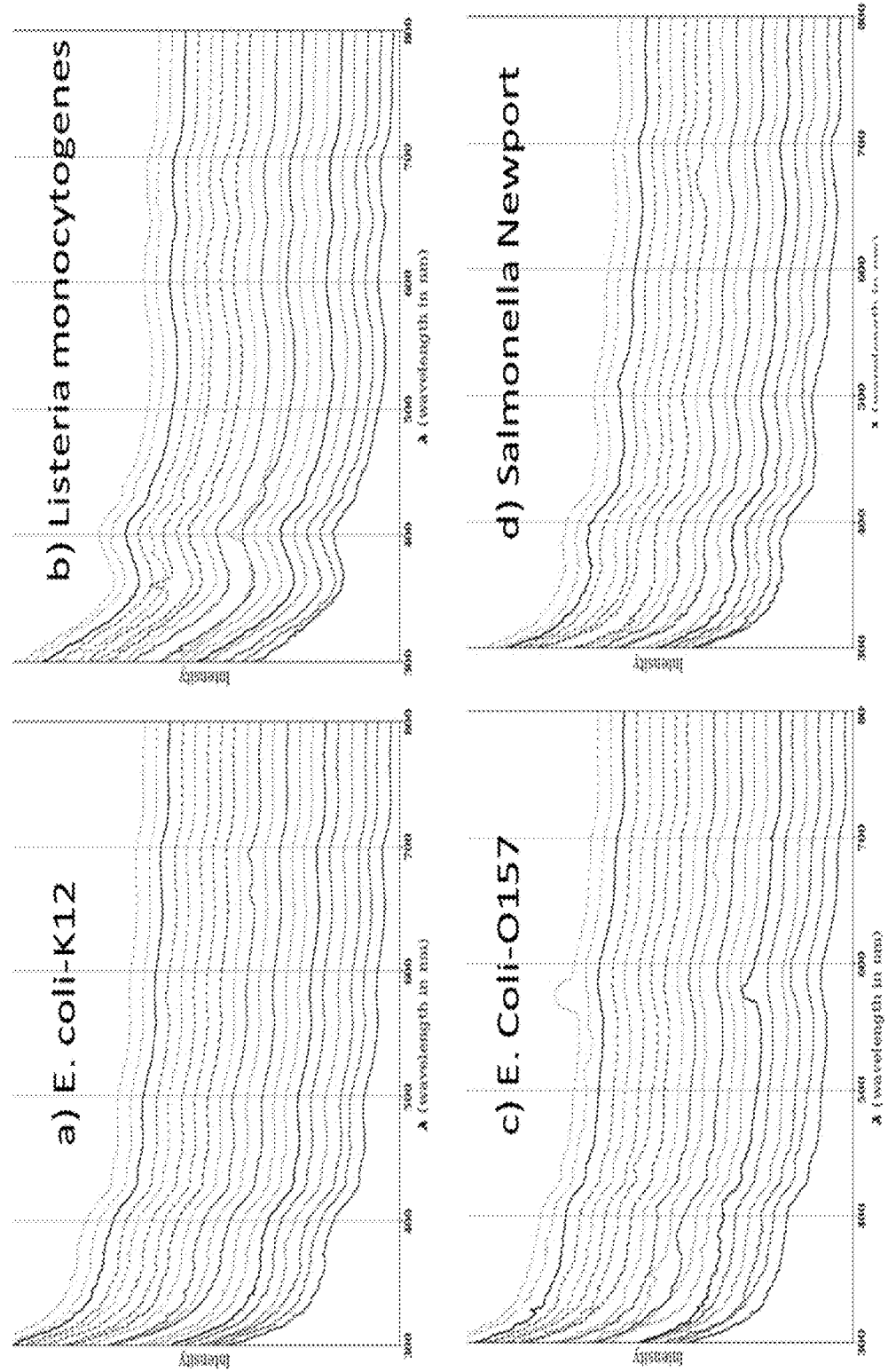
FIG. 7 illustrates elastic effects spectra for a) E. Coli-K12; b) Listeria monocytogenes; c) E. Coli-O157; and d) Salmonella Newport.

FIG. 7 illustrates elastic effects spectra for a) E. Coli-K12; b) Listeria monocytogenes; c) E. Coli-O157; and d) Salmonella Newport. Mie Scattering is sometimes referred to as Mie Diffraction.

Figure 8:
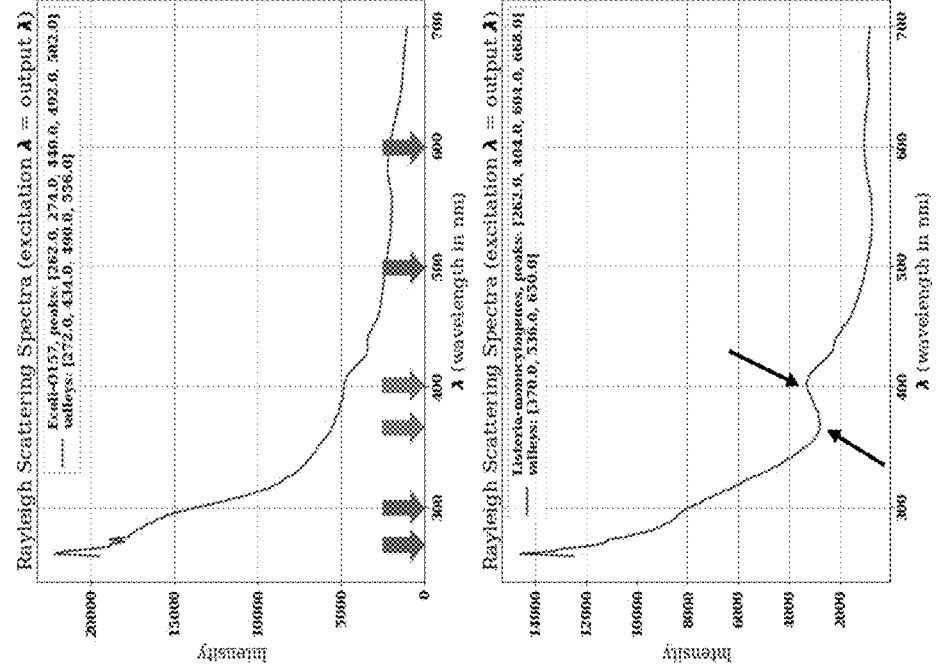
FIG. 8 illustrates average Rayleigh/Mie scattering spectra for a) E. Coli-O157; b) Salmonella Newport; c) Listeria monocytogenes; and d) E. Coli-K12.
Figure 8:
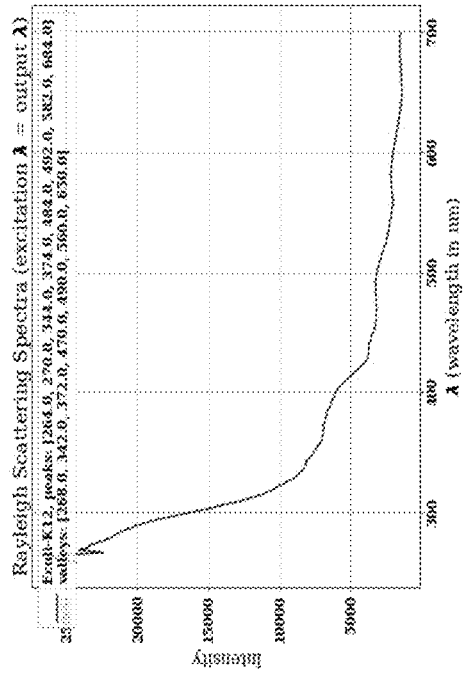

FIG. 8 illustrates average Rayleigh/Mie scattering spectra for a) E. Coli-O157; b) Salmonella Newport; c) Listeria monocytogenes; and d) E. Coli-K12.

Figure 9:
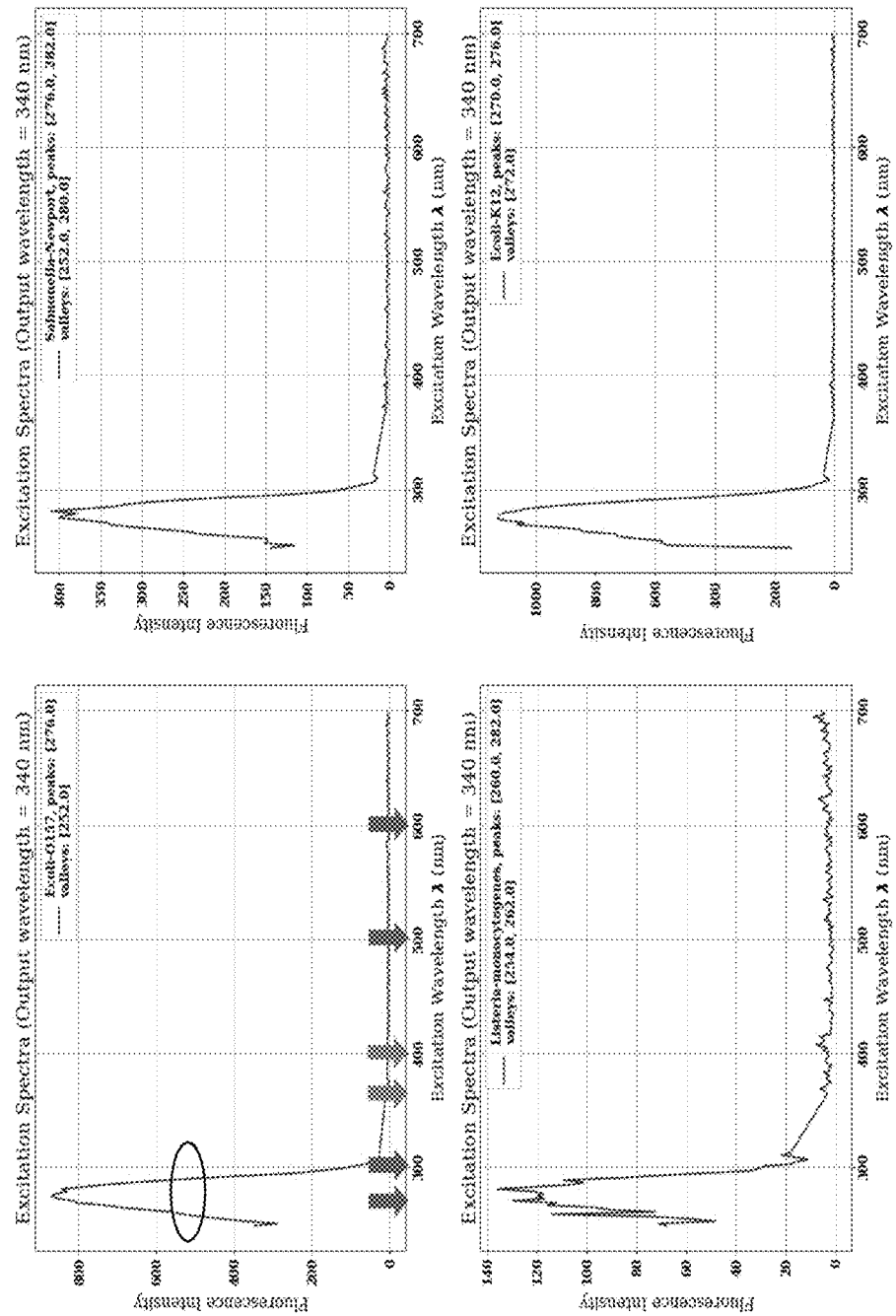
FIG. 9 illustrates average excitation spectra for a) E. Coli-O157; b) Salmonella Newport; c) Listeria monocytogenes; and d) E. Coli-K12.

FIG. 9 illustrates average excitation spectra for a) E. Coli-O157; b) Salmonella Newport; c) Listeria monocytogenes; and d) E. Coli-K12.

Figure 10:
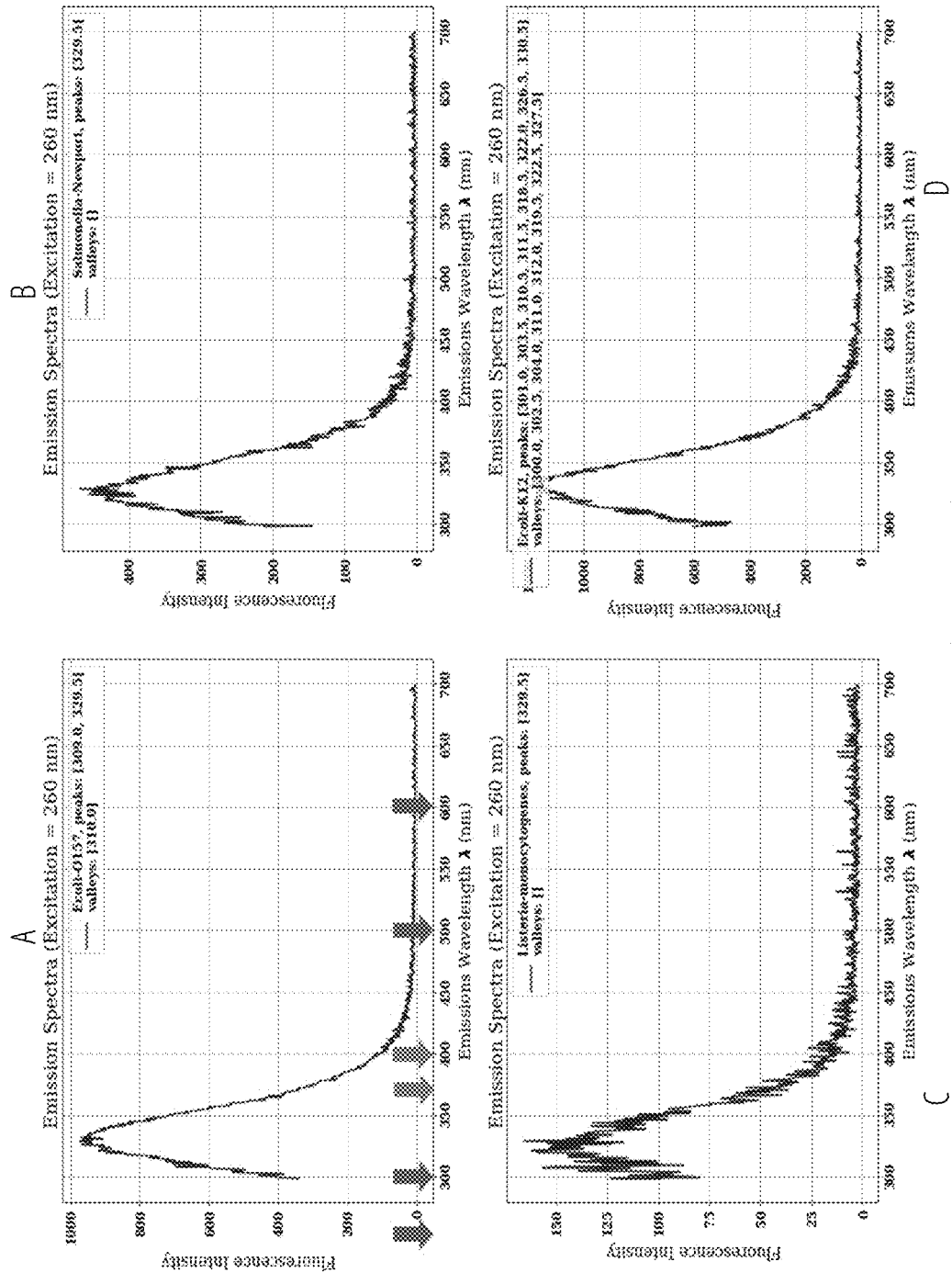
FIG. 10 illustrates average emissions spectra for a) E. Coli-O157; b) Salmonella Newport; c) Listeria monocytogenes; and d) E. Coli-K12.

FIG. 10 illustrates average emissions spectra for a) E. Coli-O157; b) Salmonella Newport; c) Listeria monocytogenes; and d) E. Coli-K12.

Figure 11:
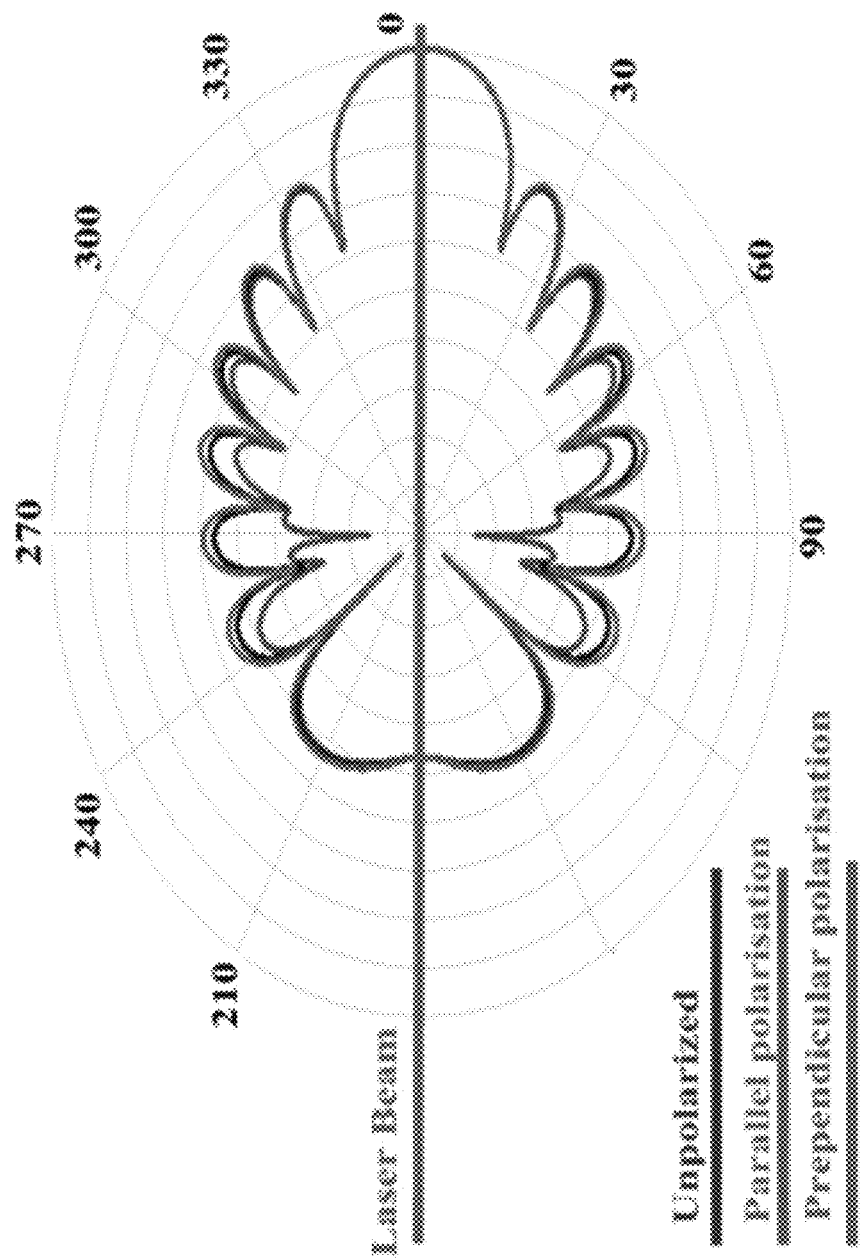
FIG. 11 illustrates Mie Scattering as a function of angle.

FIG. 11 illustrates Mie Scattering as a function of angle. Previous techniques have been based on arranging an array of sensors around the sample such that the angular pattern can be characterized. However, instead of looking at intensity versus angle at a fixed frequency input (which is the basis of previous techniques), the approaches described herein are based on intensity versus wavelength at a fixed angle. In an example, commercially available photospectrometers can provide input with respect to intensity versus wavelength at a fixed angle to machine learning mechanisms to identify key markers in the scattering spectra (e.g., as illustrated in FIG. 6 and FIG. 7) and include the corresponding wavelengths into selection of light sources to be included in the light array (e.g., light source array 102 in FIG. 1). In an example, the light array can be provided via a mini spectrophotometer.

Figure 12:
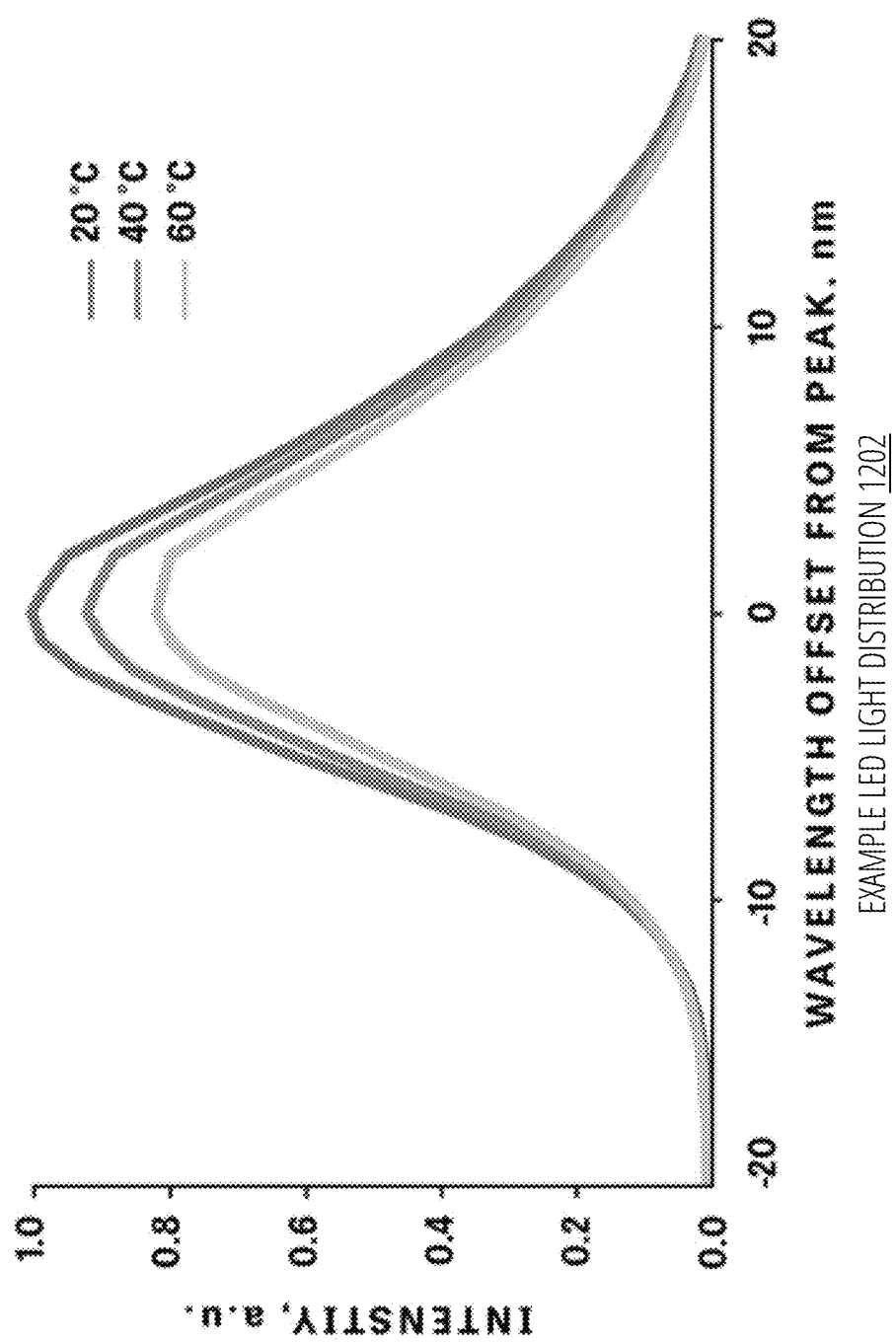
FIG. 12 illustrates a typical LED light distribution for an LED type that can be utilized in a light source array.

FIG. 12 illustrates a typical LED light distribution for an LED type that can be utilized in a light source array. In the example of FIG. 12, example LED light distribution 1202 assumes the associated spectrometer has a spectral resolution of around 3.7 nm. The use of spectrometers with different spectral resolutions may utilize LEDs with different distribution patterns.

In an example, direct scattering measurements can be supplemented with estimates of the spectra derivative by recognizing that light sources have fine bandwidths and distributions resembling Gaussian distributions. By sampling incident and scattered light at $\lambda_{exc}-\Delta\lambda$, $\lambda_{exc}$ and $\lambda_{exc}+\Delta\lambda$, where $\lambda_{exc}$ is the nominal excitation wavelength and $\Delta\lambda$ is the spectrometer resolution, an estimate of the spectral derivative can be determined even when the number of wavelengths in the light grid is limited. This approach is applicable when the spectral resolution of the spectrometer component is several times smaller than the bandwidth of the light source.

Mie Scattering theory applies across a broad range of particle sizes and wavelengths. A practical problem with Mie Scattering equations is that with the full equation set the solution is iterative (albeit exact for specific shapes) and may not convey an intuitive understanding of the underlying mechanisms. Rayleigh Scattering simplifies the full Mie solution, which assumes particle sizes much smaller than the wavelength of interest and retains only a few first terms of the Mie power series expansion. The Rayleigh mode does convey some intuition, including the $1/\lambda^4$ term.

Utilizing the techniques described herein, a solution of the general Mie expressions is not required to take advantage of the systemic species-specific information in the spectrographic data discussed above. Using the approaches described, machine learning techniques can identify and utilize the systemic species-specific information obtained and use that information to identify the underlying species in the sample.

Figure 13:
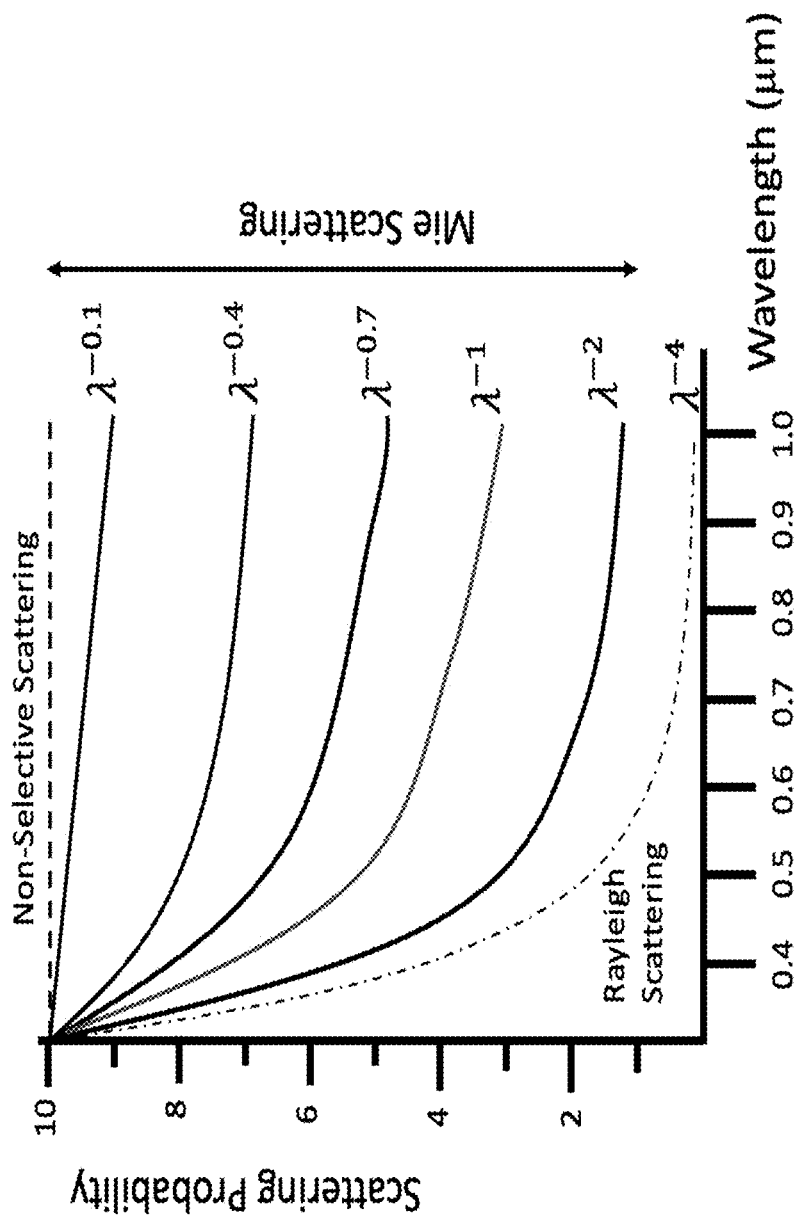
FIG. 13 illustrates scattering probability as a function of wavelength.

FIG. 13 illustrates scattering probability as a function of wavelength 1302. As illustrated in FIG. 13, scattering effects are functions of $\lambda$, object size, shape, scattering angle, conductivity and permeability. With this understanding, machine learning models can be determined to identify a species in a sample using the spectrographic information gathered as discussed above.

Figure 14:
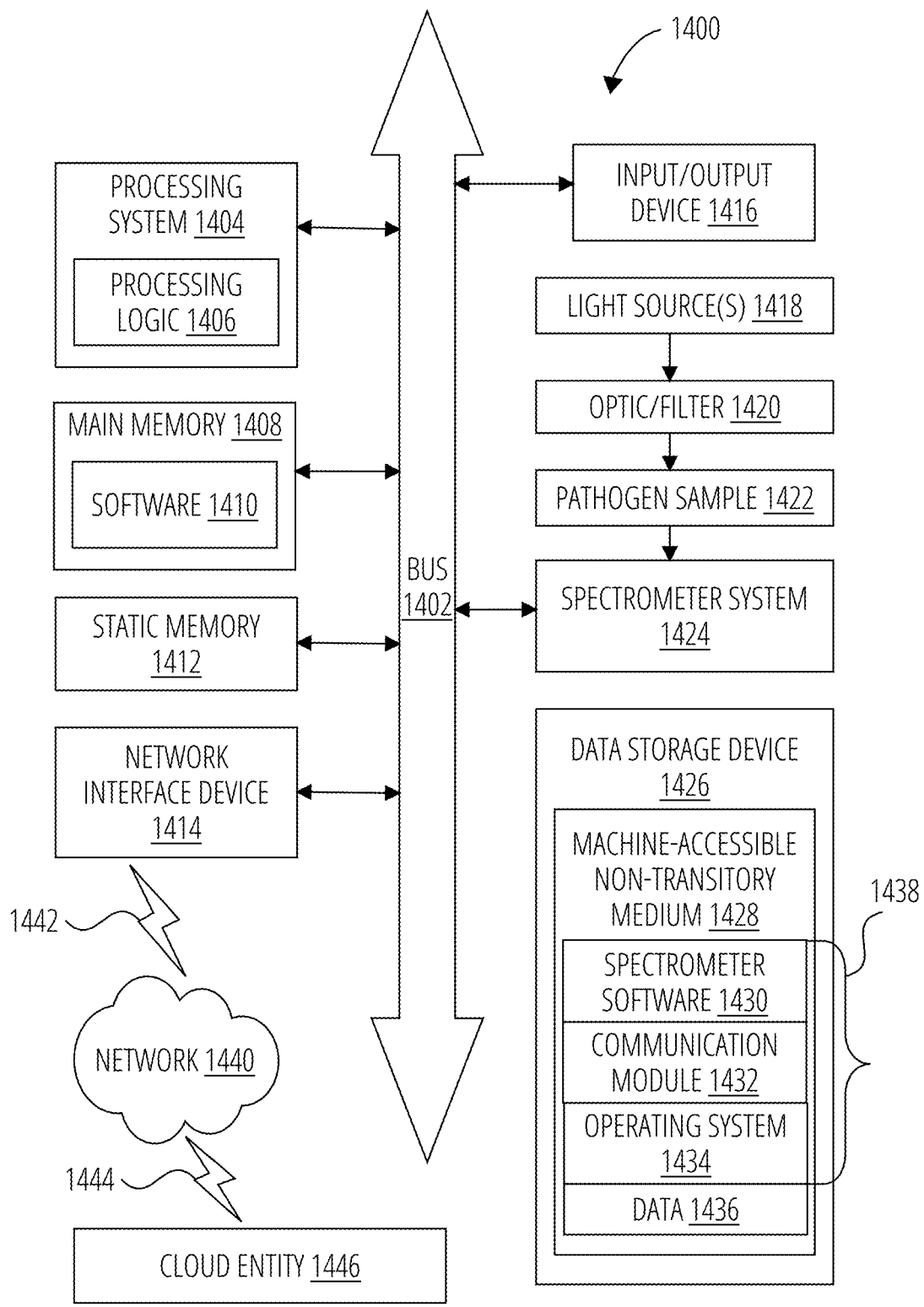
FIG. 14 is an example diagrammatic representation of a machine in the form of a computer system or device within which a set of instructions, for causing the machine to perform any one or more of the methodologies discussed herein, may be executed.

FIG. 14 is an example diagrammatic representation of a machine in the form of a computer system or device within which a set of instructions, for causing the machine to perform any one or more of the methodologies discussed herein, may be executed. In alternative embodiments, the machine may be connected (e.g., networked) to other machines in a LAN, an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 1400 (e.g., multi-spectral detection device or system 1400 that integrates optical components of two or more mini-spectrometers) includes processing system 1404, main memory 1408 (e.g., read-only memory (ROM), flash memory, dynamic random access memory (DRAM) such as synchronous DRAM (SDRAM) or Rambus DRAM (RDRAM), etc.), static memory 1412 (e.g., flash memory, static random access memory (SRAM), etc.), and data storage device 1426, which communicate with each other via bus 1402.

The multi-spectral detection system 1400 is configured to execute instructions to perform algorithms and analysis to determine at least one of specific substances detected.

The multi-spectral detection system 1400 is configured to collect data and to transmit the data directly to a remote location such as cloud entity 1446 that is connected to network 1440. Network interface device 1414 transmits the data to network 1440 over network connection 1442. The data collected by device 1400 can be stored in data storage device 1426 and also in a remote location such as cloud entity 1446 (which can be connected to network 1440 via network connection 1444) for retrieval or further processing.

Processing system 1404 represents one or more general-purpose processing devices such as a microprocessor, central processing unit, or the like. More particularly, processing system 1404 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing system 1404 may also be one or more special-purpose processing devices such as an application specific integrated circuit (ASIC), a field programmable gate array (FPGA), a digital signal processor (DSP), network processor, or the like. Processing system 1404 is configured to execute processing logic 1406 for performing the operations and steps discussed herein. Processing system 1404 may include a signal processor, AI module, digitizer, int., and synch detector.

Excitation energy from one or more excitation (i.e., light source(s) 1418) source(s) is directed through a spectral filter at target material(s) in order to generate an emission. Although light source(s) 1418 are shown, the disclosed embodiments may include any number of excitation sources, including using only a single light source. Preferably, light source or sources may produce narrow-band energy of about 10 nanometers or less. More preferably, the narrow-band energy is about 3 nanometers or less. Light sources may be turned on and off quickly, such as in a range of about or less than 0.01 of a second. Preferably, light sources may be turned on and off within a time period of about 0.001 second.

Emission energy from the targeted material or biological entity (e.g., pathogen sample 1422) is detected through an optic/low-pass spectral filter (e.g., optic/filter 1420) prior to being analyzed by a spectrometer of multiple miniature spectrometers (e.g., spectrometer system 1424). Visible light filter may be located in front of optic/low-pass spectral filter optic/filter 1420. Visible light filter helps prevent a large spectrum of light from entering the system so that the large spectrum does not overload the subsequent components with information.

Spectrometer system 1424 [or array of detectors] are coupled to a synchronous detector of processing system 1404. A miniature spectrometer design platform utilizes multiple spectrometers (e.g., spectrometer system 1424) including UV Fluorescence spectrometer, UV absorption/reflection spectrometer, a near-IR (NIR) spectrometer, a Raman spectrometer, or FTIR spectrometer.

Device 1400 may further include network interface device 1414. Device 1400 also may include input/output device 1416 or display (e.g., a liquid crystal display (LCD), a plasma display, a cathode ray tube (CRT), or touch screen for receiving user input and displaying output.

Data storage device 1426 may include machine-accessible non-transitory medium 1428 on which is stored one or more sets of instructions (e.g., software 1438) embodying any one or more of the methodologies or functions described herein. The software 1438 may include operating system 1434, spectrometer software 1430 (e.g., multispectral detection software), and communication module 1432. Software 1438 may also reside, completely or at least partially, within main memory 1408 (e.g., software 1410) and/or within processing system 1404 during execution thereof by device 1400, main memory 1408 and processing system 1404 also constituting machine-accessible storage media. Software 1438 and/or 1410 may further be transmitted or received over network 1440 via network interface device 1414.

Machine-accessible non-transitory medium 1428 may also be used to store data 1436 for measurements and analysis of the data for the detection system. Data may also be stored in other sections of device 1400, such as static memory 1412, or in cloud entity 1446.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically erasable programmable read-only memory (EEPROM), magnetic or optical cards, flash memory, or other type of computer-readable medium suitable for storing electronic instructions.

Moreover, examples may also be downloaded as a computer program product, wherein the program may be transferred from a remote computer to a requesting computer. In some examples, non-transitory computer readable storage media (e.g., machine-accessible non-transitory medium 1428) have stored thereon data representing sequences of instructions that, when executed by one or more processors (e.g., processing system 1404), cause the one or more processors to perform certain operations.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A method for classification of an aqueous sample having at least one bacteria species, the method comprising:
    applying a selected subset of available wavelengths to the aqueous sample;
    measuring an excitation-emission matrix (EEM) corresponding to the selected wavelengths applied to the aqueous sample;
    extracting a scattering (D) spectrum from the excitation-emission matrix, wherein the scattering spectrum comprises at least a Rayleigh scattering spectra or at least a Mie scattering spectra;
    extracting one or more raw features from the excitation-emission matrix and the scattering spectrum for the aqueous sample;
    performing machine learning operations corresponding to the aqueous sample based on the extracted raw features;
    generating classification information for bacteria species of the aqueous sample based on results of the machine learning operations and one or more of the excitation-emission matrix and the scattering spectrum of the aqueous sample; and
    generating an output indicating the classification information for the bacteria species in the aqueous sample.

2. The method for classification of claim 1 further comprising:
    measuring an absorbance (A) corresponding to the selected wavelengths applied to the aqueous sample;
    extracting one or more raw features from the absorbance measured for the aqueous sample;
    performing machine learning operations corresponding to the aqueous sample based on the extracted raw features;
    generating classification information for bacteria species of the aqueous sample based on results of the machine learning operations and one or more of the excitation-emission matrix and the scattering spectrum of the aqueous sample; and
    generating an output indicating the classification information for the bacteria species in the aqueous sample.

3. The method for classification of claim 1 further comprising:
    extracting at least one of an excitation (X) spectrum or an emissions (E) spectrum from the EEM;
    extracting one or more raw features from the excitation spectrum and/or the emissions spectrum measured for the aqueous sample;
    performing machine learning operations corresponding to the aqueous sample based on the extracted raw features;
    generating classification information for bacteria species of the aqueous sample based on results of the machine learning operations and one or more of the excitation-emission matrix and the scattering spectrum of the aqueous sample; and generating an output indicating the classification information for the bacteria species in the aqueous sample.

4. The method for classification of claim 1 wherein the machine learning operations are based on intensity versus wavelength at a fixed angle.

5. The method for classification of claim 1 wherein the classification is based on intensity versus wavelength at a fixed angle.

6. The method for classification of claim 1 wherein the selected subset of wavelengths comprise 260 nm, 300 nm, 370 nm, 400 nm, 500 nm, and 600 nm.

7. The method for classification of claim 1 wherein scattering measurements are supplemented with estimates of a spectra derivative by sampling incident and scattered light at $\lambda_{exc}-\Delta\lambda$, $\lambda_{exc}$ and $\lambda_{exc}+\Delta\lambda$, where $\lambda_{exc}$ is the nominal excitation wavelength and $\Delta\lambda$ is the spectrometer resolution.

8. A spectrometer system comprising:
   a light source array to project light at selected wavelengths;
   a sample platform to hold an aqueous sample having bacteria or viruses to be classified;
   a spectrometer to receive light from the light source array along a direct optical path with respect to the aqueous sample and to receive light from the light source along a 90-degree optical path with respect to the sample; and
   a compute engine coupled with the spectrometer, the spectrometer and the compute engine together to:
      apply a selected subset of available wavelengths to the aqueous sample;
      measure an excitation-emission matrix (EEM) corresponding to the selected wavelengths applied to the aqueous sample;
      extract a scattering (D) spectrum from the excitation-emission matrix, wherein the scattering spectrum comprises at least a Rayleigh scattering spectra or at least a Mie scattering spectra;
      extract one or more raw features from the excitation-emission matrix and the scattering spectrum for the aqueous sample;
      perform machine learning operations corresponding to the aqueous sample based on the extracted raw features;
      generate classification information for bacteria species of the aqueous sample based on results of the machine learning operations and one or more of the excitation-emission matrix and the scattering spectrum of the aqueous sample; and
      generate an output indicating the classification information for the bacteria species in the aqueous sample.

9. The spectrometer system of claim 8 wherein the compute engine and the spectrometer are further configured to:
   measure an absorbance (A) corresponding to the selected wavelengths applied to the aqueous sample;
   extract one or more raw features from the absorbance measured for the aqueous sample;
   perform machine learning operations corresponding to the aqueous sample based on the extracted raw features;
   generate classification information for bacteria species of the aqueous sample based on results of the machine learning operations and one or more of the excitation-emission matrix and the scattering spectrum of the aqueous sample; and
   generate an output indicating the classification information for the bacteria species in the aqueous sample.

10. The spectrometer system of claim 8 wherein the compute engine and the spectrometer are further configured to:
    extract at least one of an excitation (X) spectrum or an emissions (E) spectrum from the EEM;
    extract one or more raw features from the excitation spectrum and/or the emissions spectrum measured for the aqueous sample;
    perform machine learning operations corresponding to the aqueous sample based on the extracted raw features;
    generate classification information for bacteria species of the aqueous sample based on results of the machine learning operations and one or more of the excitation-emission matrix and the scattering spectrum of the aqueous sample; and
    generate an output indicating the classification information for the bacteria species in the aqueous sample.

11. The spectrometer system of claim 8 wherein the machine learning operations are based on intensity versus wavelength at a fixed angle.

12. The spectrometer system of claim 8 wherein the classification is based on intensity versus wavelength at a fixed angle.

13. The spectrometer system of claim 8 wherein the selected subset of available wavelengths comprise wavelengths between 250 nm and 600 nm.

14. The spectrometer system of claim 13 wherein the selected subset of available wavelengths between 250 nm and 600 nm comprise 260 nm, 300 nm, 370 nm, 400 nm, 500 nm, and 600 nm.

15. The spectrometer system of claim 8 wherein scattering measurements are supplemented with estimates of a spectra derivative by sampling incident and scattered light at $\lambda_{exc}-\Delta\lambda$, $\lambda_{exc}$ and $\lambda_{exc}+\Delta\lambda$, where $\lambda_{exc}$ is the nominal excitation wavelength and $\Delta\lambda$ is the spectrometer resolution.

16. A compute engine comprising:
    a spectrometer interface; and
    processing logic coupled with the spectrometer interface, the processing logic to receive via the spectrometer interface spectrometer data comprising at least an excitation-emission matrix (EEM) corresponding to a selected subset of available wavelengths for an aqueous sample having bacteria or viruses to be classified, the processing logic to:
       extract a scattering (D) spectrum from the excitation-emission matrix, wherein the scattering spectrum comprises at least a Rayleigh scattering spectra or at least a Mie scattering spectra;
       extract one or more raw features from the excitation-emission matrix and the scattering spectrum for the aqueous sample;
       perform machine learning operations corresponding to the aqueous sample based on the extracted raw features;
       generate classification information for bacteria species of the aqueous sample based on results of the machine learning operations and one or more of the excitation-emission matrix and the scattering spectrum of the aqueous sample; and
       generate an output indicating the classification information for the bacteria species in the aqueous sample.

17. The compute engine of claim 16 wherein the processing logic is further configured to:

measure an absorbance (A) corresponding to the selected wavelengths applied to the aqueous sample;

extract one or more raw features from the absorbance measured for the aqueous sample;

perform machine learning operations corresponding to the aqueous sample based on the extracted raw features;

generate classification information for bacteria species of the aqueous sample based on results of the machine learning operations and one or more of the excitation-emission matrix and the scattering spectrum of the aqueous sample; and generate an output indicating the classification information for the bacteria species in the aqueous sample.

18. The compute engine of claim 16 wherein the processing logic is further configured to:

extract at least one of an excitation (X) spectrum or an emissions (E) spectrum from the EEM;

extract one or more raw features from the excitation spectrum and/or the emissions spectrum measured for the aqueous sample;

perform machine learning operations corresponding to the aqueous sample based on the extracted raw features;

generate classification information for bacteria species of the aqueous sample based on results of the machine learning operations and one or more of the excitation-emission matrix and the scattering spectrum of the aqueous sample; and generate an output indicating the classification information for the bacteria species in the aqueous sample.

19. The compute engine of claim 16 wherein the selected subset of available wavelengths comprise 260 nm, 275 nm, 280 nm, 300 nm, 370 nm, 400 nm, 500 nm, and 600 nm.

20. The compute engine of claim 16 wherein direct scattering measurements are supplemented with estimates of a spectra derivative by sampling incident and scattered light at $\lambda_{exc}-\Delta\lambda$, $\lambda_{exc}$ and $\lambda_{exc}+\Delta\lambda$, where $\lambda_{exc}$ is the nominal excitation wavelength and $\Delta\lambda$ is the spectrometer resolution.

* * * * *